Patented Aug. 24, 1954

2,687,397

UNITED STATES PATENT OFFICE 2,687,397

RESIN-FORMING COMPOSITIONS CONTAINING AMINE SALTS OF SULFONIC ACIDS

Hans Dannenberg, Berkeley, Calif., assignor to Shell Development Company, Emeryville, Calif., a corporation of Delaware No Drawing. Application September 21, 1951, Serial No. 247,757

9 Claims. (Cl. 260—45.2)

This invention relates to a new composition of matter which may be used as a film-forming material to produce protective coatings. The composition is particularly useful in that, although containing reactive components, it has excellent storage stability and long "shelf life," but upon being heated as a film or otherwise, it cures to a hard tough solvent-resistant resinous material. In brief, the composition of the invention is a neutral amine salt of a sulfonic acid in admixture with a mixture of glycidyl polyether of a polyhydric phenol having a 1,2-epoxy equivalency greater than 1.0 and a convertible urea-formaldehyde condensate. The composition is very stable and does not resinify upon storage over extended periods of time at ordinary temperature. However, upon being heated to above about 100° C., the composition undergoes resinification to a hard tough product which is insoluble in organic solvents such as methyl ethyl ketone.

The glycidyl polyether of dihydric phenol employed in the mixture of resin-forming material of the invention is obtainable by reacting epichlorhydrin with a dihydric phenol in alkaline medium. The polyethers are prepared by heating the dihydric phenol with epichlorhydrin at about 50° C. to 150° C., using 1 to 2 or more mols of epichlorhydrin per mol of dihydric phenol. Also present is a base, such as sodium or potassium hydroxide in slight stoichiometric excess to the epichlorhydrin, i. e., about 2% to 30%. The heating is continued for several hours to effect the reaction and the product is then washed free of salt and base. The product, instead of being a single simple compound, is generally a complex mixture of glycidyl polyethers, but the principal product may be represented by the formula

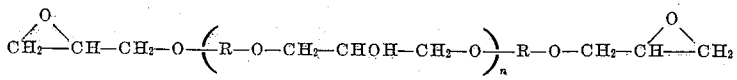

wherein $n$ is an integer of the series 0, 1, 2, 3 . . ., and R represents the divalent hydrocarbon radical of the dihydric phenol. While for any single molecule of the polyether $n$ is an integer, the fact that the obtained polyether is a mixture of compounds causes the determined value for $n$, e. g., from molecular weight measurement, to be an average which is not necessarily 0 or a whole number. Although the polyether is a substance primarily for the above formula, it may contain some material with one or both of the terminal glycidyl radicals in hydrated form.

The simplest polyether is a diglycidyl diether of the dihydric phenol which contains a single divalent aromatic hydrocarbon radical from the dihydric phenol and has two glycidyl radicals linked thereto by ethereal oxygen atoms. More generally, the polyether is of more complex character and contains two or more aromatic hydrocarbon radicals alternating with glyceryl groups in a chain which are linked together by intervening ethereal oxygen atoms, the terminal groups being glyceryl groups, which are mostly glycidyl radicals.

The glycidyl polyethers of a dihydric phenol used in the invention have a 1,2-epoxy equivalency greater than 1.0. By the epoxy equivalency, reference is made to the average number of 1,2-epoxy groups

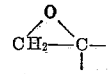

contained in the average molecule of the glycidyl ether. Owing to the method of preparation of the glycidyl polyethers and the fact that they are ordinarily a mixture of chemical compounds having somewhat different molecular weights and contain some compounds wherein the terminal glycidyl radicals are in hydrated form, the epoxy equivalency of the product is not necessarily the integer 2. However, in all cases it is a value greater than 1. The 1,2-epoxy equivalency of the polyethers is thus a value between 1.0 and 2.0.

The 1,2-epoxide value of the glycidyl polyether is determined by heating a weighed sample of the ether with an excess of 0.2 N pyridinium chloride in chloroform solution at the boiling point under reflux for 2 hours whereby the pyridinium chloride hydrochlorinates the epoxy groups to chlorhydrin groups. After cooling, the excess pyridinium chloride is back-titrated with 0.1 N sodium hydroxide in methanol to the phenolphthalein end point. This method is used for obtaining all epoxide values discussed herein.

Any of the various dihydric phenols is used in preparing the polyethers including mononuclear phenols such as resorcinol, catechol, hydroquinone, methyl resorcinol, etc.; or polynuclear phenols like 2,2-bis(4-hydroxyphenyl)propane which is herein termed bis-phenol for convenience, 4,4'-dihydroxybenzophenone, bis(4-hydroxyphenyl)methane, 1,1 - bis(4 - hydroxyphenyl)ethane, 1,1 - bis(4 - hydroxyphenyl)isobutane, 2,2 - bis(4 - hydroxyphenyl)butane, 2,2 - bis(4 - hydroxy - 2 - methylphenyl)propane, 2,2 - bis(4 - hydroxy - 2 - tertiarybutylphenyl) - propane, 2,2 - bis(2 - hydroxynaphthyl)pentane, 1,5-dihydroxynaphthalene, etc.

Preferred polyethers used in the process are prepared from 2,2-bis(4-hydroxyphenyl)propane. They contain a chain of alternating glyceryl and 2,2-bis(4-phenylene)propane radicals separated by intervening ethereal oxygen atoms, have a 1,2-epoxy equivalency between 1.0 and 2.0, and have a molecular weight of about 1200 to 4000. More generally, it is preferred to employ glycidyl polyether of a dihydric phenol which has a value for $n$ in the above-mentioned structural formula of about 6 to 15.

The glycidyl polyethers will be mode fully understood from consideration of the following described preparations and the properties of the products.

POLYETHER A

In a vessel fitted with an agitator, 228 parts (1 mol) of bis-phenol and 55 parts (1.37 mols) sodium hydroxide as a 10% aqueous solution are introduced and heated to about 45° C. whereupon 113 parts (1.22 mols) of epichlorhydrin are added rapidly while agitating the mixture. The temperature of the mixture is then gradually increased and maintained at about 95° C. for 80 minutes. The mixture separates into a two-phase system and the aqueous layer is drawn off from the taffy-like product which forms. The latter is washed with hot water while molten until the wash water is neutral to litmus. The product is then drained and dried by heating to a final temperature of 130° C. The softening point of the resulting glycidyl polyether is 98° C. by Durran's Mercury method. The molecular weight of the product is 1400 as measured ebullioscopically in ethylene dichloride, and it has an epoxide value of 0.103 equivalents epoxy per 100 grams. It will be identified hereinafter as polyether A.

POLYETHER B

Glycidyl polyethers of still higher molecular weight are most easily prepared by heating together and reacting a lower polyether with additional dihydric phenol. 100 parts of polyether A are heated to 150° C., and then 5 parts of bis-phenol are added. The heating is continued for about two hours while stirring the reaction mass and gradually increasing the temperature to about 200° C. The resulting product has a softening point of 131° C., a molecular weight of 2900, and an epoxide value of 0.05 equivalents epoxy per 100 grams.

POLYETHER C

This polyether is prepared as described for polyether D except that the 100 parts of polyether A are mixed, heated and reacted with 7.75 parts of bis-phenol. The resulting product has a softening point of 156° C., a molecular weight of 3750, and an epoxide value of 0.036 equivalents epoxy per 100 grams.

The properties of the foregoing polyethers are summarized in the following table:

| Polyether | Softening Point, ° C. | Mol. Wt. | $n$ | Epoxy Value, eq./100 g. | 1,2-epoxy Equivalency |
|---|---|---|---|---|---|
| A | 98 | 1,400 | 3.74 | 0.103 | 1.46 |
| B | 131 | 2,900 | 9.02 | 0.05 | 1.45 |
| C | 156 | 3,750 | 12.00 | 0.036 | 1.40 |

The convertible urea-formaldehyde condensate used in admixture with the glycidyl polyether is one obtained in known manner. It is a material which is soluble in organic solvents and capable of being converted to a form which is insoluble in such solvents. A condensate particularly suited for use in the invention is what will be termed an alkylated urea-formaldehyde condensate, by which term reference is made to urea-formaldehyde condensates containing substituent groups from alcohols. These alkylated urea-formaldehyde condensates are prepared by reacting formaldehyde with urea and an alcohol in the presence of an acid, or by first reacting urea with formaldehyde in alkaline medium so that a methylol urea is formed and then reacting this product with alcohol in an acid medium. Well suited for use in the invention are those alkylated urea-formaldehyde condensates derived from saturated aliphatic alcohols of 2 to 8 carbon atoms, and particularly suited is the butylated urea-formaldehyde condensate obtained from n-butyl alcohol. These alkylated urea-formaldehyde condensates are soluble in various organic solvents including n-butyl alcohol. Preparation of the condensates will not be reiterated here in detail since they have been repeatedly described in the prior art and the preparation is adequately disclosed in Patent Nos. 2,222,506; 2,226,518; 2,227,223; 2,322,979; 2,327,984; 2,323,357; 2,326,265; and 2,350,894.

The proportions of the two components in the mixture of the glycidyl polyether and urea-formaldehyde condensate can be varied widely. A desirable weight ratio of glycidyl polyether to urea-formaldehyde condensate is from about 90:10 to 30:70, but the invention is not limited to such a range of ratios. A more preferred range is from about 85:15 to 60:40, i. e., a mixture containing about 15 to 40% of the urea-formaldehyde condensate. Products having excellent properties are obtained with a mixture containing about 30% urea-formaldehyde condensate and about 70% glycidyl polyether.

The amine salt of a sulfonic acid which functions as a heat-activated curing agent for the resin-forming components in the composition of the invention is obtained by simply neutralizing the sulfonic acid with an amine. It appears that any amine which will give a neutral salt with the sulfonic acid is suitable. The amine contains one or more primary, secondary and/or tertiary amino groups, and is preferably free of other acid and basic acting groups. Representative amines include such compounds as methylamine, dimethylamine, trimethylamine, ethylamine, diethylamine, triethylamine, ethanolamine, diethanolamine, 2-chlorethylamine, diisopropylamine, hexylamine, diethylenetriamine, cetyldimethylamine, nonylamine, hexamethylenediamine, morpholine, 2,6-dimethylmorpholine, N-butylmorpholine, N,N-dimethylmorpholine, aniline, benzylamine, benzyldimethylamine, chloraniline, pyrrole, pyridine, piperidine, pyrimidine, piperazine and the like.

The organic sulfonic acids which are employed as amine salts in the invention have the sulfonic acid group or groups linked to aliphatic, aromatic, or alicyclic hydrocarbon radicals, which radicals are preferably free of other basic and acid acting groups. They include, for example, aliphatic monosulfonic acids such as methanesulfonic acid, ethanesulfonic acid, propane-1-sulfonic acid, propane-2-sulfonic acid, butane-1-sulfonic acid, 2-methylpropane-1-sulfonic acid, butane-2-sulfonic acid, hexane-1-sulfonic acid, decane-1-sulfonic acid, dodecane-1-sulfonic acid, hexadecane-1-sulfonic acid, ethanesulfonic acid, propene-2-sulfonic acid, 2-methylpropene-3-sulfonic acid, and diisobutylenesulfonic acid; the aliphatic polysulfonic acids such as methanedisulfonic acid, ethane-1,1-disulfonic acid, ethane-1,2-disulfonic acid, 2-methylpropane-1,2-disulfonic acid, methanetrisulfonic acid, and ethane-1,1,2-trisulfonic acid; the aromatic monosulfonic acids, such as benzenesulfonic acid, o-toluenesulfonic acid, m-toluenesulfonic acid, p-toluenesulfonic acid, 2,4-dimethylsulfonic acid, dodecylbenzenesulfonic acid, naphthalene-1-sulfonic acid, naphthaline-2-sulfonic acid, 2,4,5-trimethylsulfonic acid, benzylsulfonic acid, phenylethanesulfonic acid, 1-phenylethene-2-sulfonic acid, mesitylenesulfonic acid, and m-cymenesulfonic acid; the aromatic polysulfonic acids such as m-benzenedisulfonic acid, p-benzenedisulfonic acid, benzene-1,3,5-trisulfonic acid, and toluene-2,4-disulfonic acid; and the alicyclic sulfonic acids such as cyclopentanesulfonic acid and cyclohexanesulfonic acid.

The salts are prepared by simple neutralization of the sulfonic acid with the amine. For example, a particularly preferred salt, morpholinium p-toluenesulfonate, is prepared as follows: Thirty grams of p-toluenesulfonic acid monohydrate are dissolved in 60 grams of acetone and the solution placed in an ice bath. Approximately 16 grams of morpholine are added slowly with stirring so the temperature does not exceed 15° C. A very small excess of morpholine is employed so that the mixture is slightly alkaline to indicator paper. Crystals of salt form immediately, are removed by filtration, washed with cold acetone and recrystallized from boiling acetone (about 10 ml. per gram of salt). The recrystallized salt is filtered after cooling in ice water and dried at room temperature. A second crop is obtained by drying the mother liquor with anhydrous calcium sulfate and concentrating in vacuo; a third crop by evaporating, in vacuo, the mother liquor from the second crop to dryness. The crystals thus obtained are likewise purified by recrystallization and a total of 27.5 grams of salt obtained. The melting point of the salt is 126° C. For general use in varnishes, enamels and the like, it is not necessary to prepare the crystalline salt. A solution of the salt in a solvent consisting of equal parts by weight of xylene and n-butyl alcohol is easily obtained by neutralizing a solution of sulfonic acid in the solvent with the amine.

The salt employed is neutral in the sense that it is neither acid nor basic because the presence of unneutralized acidic or basic groups therein adversely affects the stability against gelation of the composition of the invention. Thus in preparing the salt of diethylamine and m-benzenedisulfonic acid, there is used 2 mols of the amine per mol of the acid. Likewise, in preparing the salt of ethylenediamine and p-toluenesulfonic acid, there is used 1 mol of amine with 2 mols of acid. Although it is preferred to employ salts of amines free of other acid or basic acting groups than the amino group and sulfonic acids free of other acid or basic acting groups than the sulfonic acid group, the amine and/or sulfonic acid may contain such other acidic and/or basic groups since neutral salts are employed. Thus there may be used the neutral salt of butylamine and sulfoacetic acid prepared by neutralizing 1 mol of the acid with 2 mols of the amine.

The salts are used in small proportions in the composition of the invention since they have powerful catalytic activity which is brought into action by heating. Ordinarily, about 0.5 to 2% by weight of salt based upon the combined weight of the glycidyl polyether and the urea-aldehyde condensate is employed. However, the range may be extended, especially on the upper side, although this is usually avoided because of increased cost and lack of necessity. Thus there may be used from about 0.1 to 10% as well as higher percentages.

The composition of the invention is prepared by mixing together the three components thereof. This is conveniently accomplished in a solvent. A variety of substances are suitable for this purpose including ketones such as acetone, methyl ethyl ketone, methyl isobutyl ketone, isophorone, etc.; ether alcohols, such as methyl, ethyl or butyl ether of ethylene glycol or diethylene glycol; and chlorinated solvents, such as trichloropropane, chloroform, etc. To save expense, these active solvents are ordinarily used in admixture with diluents which are themselves not solvents when used alone, but which may be incorporated with active solvents. Reference is made to aromatic hydrocarbons, such as benzene, toluene, xylene, aromatic petroleum thinner, etc.; and alcohols such as ethyl, isopropyl and n-butyl alcohol. In order to achieve desired evaporation and drying characteristics, the solvents are combined and balanced for desired properties in the manner well known in the lacquer and varnish arts. Typical solvent combinations are illustrated in examples given hereinafter.

With some of the salts which have fewer carbon atoms, trouble is occasionally encountered in obtaining complete solution thereof in solutions of the composition. This is readily overcome by including about 0.2 to 1% of water therein. The difficulty may also be avoided by employing salts having high ratios of carbon atoms to amine-sulfonate salt groups as is the case with the salt of cetyl amine salt and dodecylbenzenesulfonic acid.

Solvent-free compositions suitable for molding operations and the like may be obtained by evaporating the solvent from the obtained solutions. The evaporation is effected at a temperature below that which activates the salt curing catalyst, and thus, premature gelation is avoided. A temperature below about 80° C. is usually satisfactory for this purpose.

The composition of the invention cures to a hard resinous material in short time upon being heated to a temperature above about 100° C. Excellent cure is obtained at about 150° C., and satisfactory cure may be obtained within the range of about 125° C. to 250° C. provided the time of heating is correlated with the temperature. Complete cure is obtained in about one minute's time at 230° C., but an hour may be required at 125° C. with use of about 1% of the preferred salt, morpholinium p-toluenesulfonate.

The resulting cured resinous product is hard and tough, and has outstanding resistance against the deteriorating and destructive action of alkalies. The cured resinous products of the invention are thus of great value as surface coating films for protection of metal surfaces which come into repeated contact with alkaline materials such as soapy water, as is the case with washing machines. By use of proper time and temperature in curing, the obtained resinous product has a very tight cure and insolubility in all non-destructive solvents such as methyl ethyl ketone, for example.

When used as film-forming materials which may be applied by brushing, spraying and the like, the compositions containing the glycidyl polyether, the urea condensate and salt catalyst may also contain various other materials such as pigments, plasticizers, and other resins. Pigments such as titanium dioxide, antimony oxide, lead oxide, carbon black, chrome yellow, zinc oxide, para red, and the like, are used in the compositions. Best results in preparing enamels are obtained by grinding the pigment with a portion of the solvent and urea condensate and then adding the remainder of the solvent and glycidyl polyether after the grinding operation. The enamel is ready for application after addition of the curing catalyst.

With either varnishes or enamels of the invention, thick layers of the film-forming material may be applied to a surface such as metal, wood, or the like. Curing completely therethrough is attained because the conversion to an insoluble film is not dependent upon contact with air. This fact also makes the compositions valuable in manufacture of laminates wherein the laminae are cloth, paper, glass-cloth, and the like. Such laminae are impregnated with a solution of the glycidyl polyether and curing catalyst. After drying, the impregnated sheets are stacked and cure is effected in a heated press.

Many of the compositions are also suitable for molding operations wherein they are introduced into a mold, compressed and cure completed with heat. Various fillers, dyes and pigments may be incorporated with the compositions in use for molding operations such as wood flour, talc, alphacellulose, zinc sulfide, etc.

The following examples are given to illustrate the invention, but they are not to be construed as limitative thereof. The parts and percentages are by weight.

EXAMPLE 1

Stock solutions were prepared containing polyether B or polyether C in admixture with butylated urea-formaldehyde resin, obtained by condensing urea with formaldehyde in the presence of n-butyl alcohol. A commercial solution was used containing 50% butylated urea-formaldehyde resin in a 60:40 weight ratio of n-butyl alcohol and xylene. The stock solutions were prepared so as to contain a total of about 37.5% resin-forming material therein with use of a solvent containing equal parts by weight of xylene and Cellosolve acetate (ethylene glycol monoacetone). Stock solution I contained polyether B and the urea resin in a weight ratio of 70:30. Stock solution II contained the same ingredients in a weight ratio of 80:20. Stock solution III contained polyether C and the urea resin in a weight ratio of 70:30 while stock solution IV contained the same ingredients in a weight ratio of 80:20. A 10% solution of the morpholine salt of p-toluenesulfonic acid was prepared and added to three portions of each stock solution so that there was present 0.2, 0.5 and 1.0 part of salt per 100 parts of resin-forming material (the polyether plus the urea resin). Metal panels were coated with the solutions containing the salt with use of cold-rolled steel sheeting (24 gauge) and a Fischer-Payne dip coater operated at a speed of 2 inches per minute. After an air-drying period of at least 30 minutes, the panels were baked for 30 minutes in an air oven at the temperatures listed in Table II below. The films were about 0.5 mil thick.

In order to determine the extent of cure and character of the resinous films, the coatings were separately subjected to a test with methyl ethyl ketone (MEK test), this ketone being a solvent for uncured films, and a test with boiling water (boiling $H_2O$ test). The MEK test was performed by placing a drop of methyl ethyl ketone on the coating and scratching the exposed portion of film with a sharpened pencil point (grade F). A well-cured film resisted damaging effect of the pencil point applied with moderate finger pressure. Incompletely converted films showed varying extents of swelling, softening or dissolving and becoming sticky. A rating system was employed as indicated in Table I below.

The boiling $H_2O$ test was performed by immersing the coatings in boiling water, and after cooling, inspecting them in two respects, the extent of whitening of the film and the adherence of the film to the substrate. A rating system was employed, as given in Table I, to record both indications. Under boiling $H_2O$ test in Table II, the first number refers to the extent of whitening and the second to the adherence. Thus the symbol 8-10 means a slight whitening and no loss of adhesion.

These same ratings are used in the example to follow.

Table I

| Rating | MEK Test | Boiling $H_2O$ Test | |
|---|---|---|---|
| | | Whitening | Adhesion |
| 10 | Unchanged | No whitening | No loss of adhesion. |
| 9 | | | |
| 8 | Softened | Hazy to milky | Blistering. |
| 7 | | | |
| 6 | | | |
| 5 | | | |
| 4 | Partly soluble | Milky to white | Film loosened. |
| 3 | | | |
| 2 | Soluble | White (opaque) | Film removed. |
| 1 | | | |

The films obtained were hard, smooth and free of cratering or crawling. The results obtained with the two tests described above are listed in Table II following wherein the listed temperatures are the temperatures of bake for effecting cure of the films on the panels.

Table II

| Stock Solution | Added, Percent Salt | MEK Test | | | | | Boiling $H_2O$ Test | | | | |
|---|---|---|---|---|---|---|---|---|---|---|---|
| | | 93° C. | 121° C. | 149° C. | 177° C. | 204° C. | 93° C. | 121° C. | 149° C. | 177° C. | 204° C. |
| I | 0.2 | 3 | 10 | 10 | 10 | 10 | 6-6 | 8-10 | 8-10 | 10-10 | 10-10 |
| I | 0.5 | 3 | 10 | 10 | 10 | 10 | 6-6 | 10-10 | 10-10 | 10-10 | 10-10 |
| I | 1.0 | 4 | 10 | 10 | 10 | 10 | 6-6 | 10-10 | 10-10 | 10-10 | 10 10 |
| II | 0.2 | 1 | 9 | 10 | 10 | 10 | 4-4 | 8-10 | 8-10 | 10-10 | 10-10 |
| II | 0.5 | 3 | 10 | 10 | 10 | 10 | 4-8 | 8-10 | 10-10 | 10-10 | 10-10 |
| II | 1.0 | 4 | 10 | 10 | 10 | 10 | 4-4 | 8-10 | 10-10 | 10-10 | 10-10 |
| III | 0.2 | 4 | 10 | 10 | 10 | 10 | 4-6 | 10-10 | 10-10 | 10-10 | 10-10 |
| III | 0.5 | 7 | 10 | 10 | 10 | 10 | 4-6 | 10-10 | 10-10 | 10-10 | 10-10 |
| III | 1.0 | 9 | 10 | 10 | 10 | 10 | 6-6 | 8-8 | 8-10 | 8-10 | 8-8 |
| IV | 0.2 | 1 | 8 | 10 | 10 | 10 | 4-6 | 8-8 | 10-8 | 10-8 | 8-6 |
| IV | 0.5 | 6 | 10 | 10 | 10 | 10 | 4-6 | 8-8 | 10-10 | 10-10 | 8-6 |
| IV | 1.0 | 8 | 10 | 10 | 10 | 10 | 1-6 | 8-8 | 10-10 | 10-10 | 8-6 |

EXAMPLE 2

The compositions of the invention as well as solutions thereof have excellent storage stability. When stored at ordinary temperature, they are resistant against gelation and resinification indefinitely. Data on this point will be given in this example, the storage stability being judged by measurement of viscosity according to the Gardner-Holdt scale.

Two of the stock solutions containing the morpholine salt of p-toluenesulfonic acid described in Example 1 were stored at room temperature of about 20° C. to 25° C. The first of these was the composition with stock solution I having an added 1% of the salt therein. The initial viscosity was G, and after 42 days' storage, the viscosity had increased only slightly to between G and H. When a total of 133 days had passed (over 5 months' time), the viscosity had increased to between I and J.

The other was the composition with stock solution III containing the added 1% of the salt, which composition had an initial viscosity of K. After 29 days' time, the viscosity was between L and M. The composition had a viscosity of only T after 119 days' storage.

In contrast to the stable compositions noted above, the same compositions containing like percentages of the free p-toluenesulfonic acid in place of its salt will gel in a few minutes' time.

A solution was also prepared containing about 85 parts polyether C and 15 parts of butylated urea-formaldehyde resin in about 113 parts of methyl isobutyl ketone, 75 parts of toluene, 63 parts of Cellosolve acetate, 6 parts of xylene and 9 parts of normal butyl alcohol to which was added about 2 parts of the neutral salt from 1 mol of m-benzenedisulfonic acid and 2 mols of triethylamine. The initial viscosity of the solution was between J and K. After storage for 7 days' time at room temperature, the viscosity was unchanged. Upon replacing the 2 parts of salt with a like amount of free m-benzenedisulfonic acid, the solution gelled almost immediately. Upon reducing the amount of free acid to only 0.25 parts, the solution gelled within 4 hours.

EXAMPLE 3

An enamel base was prepared containing 409 parts of titanium dioxide pigment (Rutile $TiO_2$) dispersed in 400 parts of polyether A and 100 parts of butylated urea-formaldehyde resin (from Beetle 227-8) in a solvent mixture consisting of 315 parts of Cellosolve acetate, 355 parts of xylene and 60 parts of n-butyl alcohol, and the mixture was pebble milled for 56 hours.

To a portion of the enamel base was added 0.82 part of the pyridine salt of p-toluenesulfonic acid per 100 parts of resin-forming material (the polyether plus the urea resin). A film of the enamel, which had stood at room temperature for four days after preparation, was coated on a sheet steel panel, allowed to air dry for evaporation of the solvent, and then baked in an air oven for 30 minutes at 150° C. A hard tough cured film was obtained as evidenced by it having a rating of 10 by the MEK test.

Another portion of the enamel base had 1.71 parts of the morpholine salt of p-toluenesulfonic acid per 100 parts of resin-forming material added thereto. This enamel was also coated on a sheet steel panel, and after air drying, was baked for 30 minutes at 150° C. The resulting glossy tough film also had a rating of 10 by the MEK test.

EXAMPLE 4

A stock solution was prepared containing 70 parts of polyether B and 30 parts of butylated urea-formaldehyde resin (from Beetle 227-8) dissolved in 63 parts of Cellosolve acetate, 75 parts of xylene and 18 parts of n-butyl alcohol. To portions of the stock solution, there was added 1 part of the neutral salts listed in Table III below per 100 parts of resin-forming material (the polyether plus the urea resin), the salts being added as 10% solutions in either n-butyl acetate or a mixture of equal weights of n-butyl alcohol and xylene. Metal panels of sheet steel were dip coated with the solutions as described in Example 1, allowed to air dry for at least 30 minutes, and then baked for 30 minutes in an air oven at the temperatures given in Table III. The resulting panels were subjected to the MEK test and the boiling $H_2O$ test with the following results.

*Table III*

| Composition | Salt From— | Baking Temp., °C. | MEK Test | Boiling $H^2O$ Test |
|---|---|---|---|---|
| A | Aniline and p-Toluenesulfonic Acid. | 120<br>150<br>175<br>200 | 10<br>10<br>10<br>10 | 7-10<br>9-10<br>10-10<br>9-10 |
| B | Diisopropylamine and p-Toluenesulfonic Acid. | 120<br>150<br>175<br>200 | 5<br>10<br>10<br>10 | 7-10<br>9-10<br>9-10<br>10-10 |
| C | Triethylamine and p-Toluenesulfonic Acid. | 120<br>150<br>175<br>200 | 5<br>10<br>10<br>10 | 7-10<br>10-10<br>10-10<br>10-10 |
| D | Diethylamine and p-Toluenesulfonic Acid. | 120<br>150<br>175<br>200 | 5<br>10<br>10<br>10 | 7-10<br>10-10<br>10-10<br>10-10 |
| E | Morpholine and m-Benzenedisulfonic Acid. | 120<br>150<br>175 | 6<br>10<br>10 | 7-10<br>9-10<br>9-10 |

EXAMPLE 5

Several of the compositions described in Example 4 were stored at room temperature of about 20° C. to 25° C. to determine their storage stability. They did not gel and underwent to change except for a small increase in viscosity as indicated in Table IV.

*Table IV*

| Composition | Gardner-Holdt Viscosity After— | | | |
|---|---|---|---|---|
| | Initial | 30 Days | 3 Mos. | 6 Mos. |
| B | G | G | I | L |
| C | H | H | I | J |
| D | H | H | H-I | J |

EXAMPLE 6

The neutral salt of cetyldimethylamine and mixed $C_1-C_3$ alkanesulfonic acids (Indoil Chemical Products) was employed in the example. To a portion of the stock solution described in Example 5, 1 part of the salt per 100 parts of resin-forming materials was added, the salt being introduced as 25% solution in Cellosolve acetate. A sheet steel panel was dip coated in the solution, allowed to air dry for about 30 minutes, and then was baked in an air oven for 30 minutes at 140° C. Complete cure was obtained as was indicated by a rating of 10 by the MEK test.

I claim as my invention:

1. A composition adapted to cure to a hard resinous product upon being heated to a temperature above about 100° C. which comprises a mixture of glycidyl polyether of a polyhydric phenol having a 1,2-epoxy equivalency greater than 1.0 and a convertible urea-formaldehyde condensate in admixture with a small amount of a neutral salt of an amine and a sulfonic acid, said amine being a member of the group consisting of morpholine, triethylamine, pyridine, aniline, diisopropylamine, diethylamine and cetyldimethylamine.

2. A composition which comprises a mixture of glycidyl polyether of a dihydric phenol having a 1,2-epoxy equivalency between 1.0 and 2.0 and a convertible alkylated urea-formaldehyde condensate soluble in n-butyl alcohol in admixture with about an added 0.2 to 5% by weight of a neutral salt of an amine and a sulfonic acid, the composition containing a weight ratio of said polyether to said condensate of from about 90:10 to 30:70, said amine being a member of the group consisting of morpholine, triethylamine, pyridine, aniline, diisopropylamine, diethylamine and cetyldimethylamine.

3. A composition which comprises a mixture of glycidyl polyether of a dihydric phenol having a 1,2-epoxy equivalency between 1.0 and 2.0 and a convertible alkylated urea-formaldehyde condensate soluble in n-butyl alcohol in admixture with about an added 0.2 to 5% by weight of the neutral salt of morpholine and p-toluenesulfonic acid, the composition containing a weight ratio of said polyether to said condensate of from about 90:10 to 30:70.

4. A composition which comprises a mixture of glycidyl polyether of a dihydric phenol having a 1,2-epoxy equivalency between 1.0 and 2.0 and a convertible urea-formaldehyde condensate containing about 15 to 40% by weight of the latter in admixture with about an added 0.2 to 5% by weight of the neutral salt of morpholine and a substituted hydrocarbon containing as sole substituent group from 1 to 3 sulfonic acid groups.

5. A composition which comprises a mixture of glycidyl polyether of 2,2-bis(4-hydroxyphenyl)-propane having a 1,2-epoxy equivalency between 1.0 and 2.0 and a convertible urea-formaldehyde condensate containing about 15 to 40% by weight of the latter in admixture with about an added 0.2 to 5% by weight of the neutral salt of morpholine and p-toluenesulfonic acid.

6. A composition which comprises a mixture of glycidyl polyether of a dihydric phenol having a 1,2-epoxy equivalency between 1.0 and 2.0 and a convertible urea-formaldehyde condensate containing about 15 to 40% by weight of the latter in admixture with about an added 0.2 to 5% by weight of the neutral salt of diisopropylamine and p-toluenesulfonic acid.

7. A composition which comprises a mixture of glycidyl polyether of 2,2-bis(4-hydroxyphenyl)-propane having a 1,2-epoxy equivalency between 1.0 and 2.0 and a convertible urea-formaldehyde condensate containing about 15 to 40% by weight of the latter in admixture with about an added 0.2 to 5% by weight of the neutral salt of diisoproplyamine and p-toluenesulfonic acid.

8. A composition which comprises a mixture of glycidyl polyether of a dihydric phenol having a 1,2-epoxy equivalency between 1.0 and 2.0 and a convertible urea-formaldehyde condensate containing about 15 to 40% by weight of the latter in admixture with about an added 0.2 to 5% by weight of the neutral salt of triethylamine and p-toluenesulfonic acid.

9. A composition which comprises a mixture of glycidyl polyether of 2,2-bis(4-hydroxyphenyl)-propane having a 1,2-epoxy equivalency between 1.0 and 2.0 and a convertible urea-formaldehyde condensate containing about 15 to 40% by weight of the latter in admixture with about an added 0.2 to 5% by weight of the neutral salt of triethylamine and p-toluenesulfonic acid.

References Cited in the file of this patent

UNITED STATES PATENTS

| Number | Name | Date |
|---|---|---|
| 2,088,227 | Battye et al. | July 27, 1937 |
| 2,446,867 | Cordier | Aug. 10, 1948 |
| 2,512,996 | Bixler | June 27, 1950 |
| 2,591,539 | Greenlee | Apr. 1, 1952 |

OTHER REFERENCES

"Epon Resins," Paint, Oil and Chemical Review, vol. 113, No. 23, Nov. 9, 1950, pages 15–18, 48 and 49.